US008421789B2

(12) United States Patent
Ka

(10) Patent No.: US 8,421,789 B2
(45) Date of Patent: Apr. 16, 2013

(54) MOTHER SUBSTRATE OF ORGANIC LIGHT EMITTING DISPLAY DEVICES AND METHOD OF AGING THE SAME

(75) Inventor: Ji-Hyun Ka, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 686 days.

(21) Appl. No.: 12/388,325

(22) Filed: Feb. 18, 2009

(65) Prior Publication Data

US 2009/0278835 A1 Nov. 12, 2009

(30) Foreign Application Priority Data

May 7, 2008 (KR) ........................ 10-2008-0042211

(51) Int. Cl.
*G06F 3/038* (2006.01)

(52) U.S. Cl.
USPC ............... 345/211; 345/212; 345/76; 345/82; 345/92

(58) Field of Classification Search .................... 345/76, 345/82, 92, 211, 690, 212, 89; 313/504; 324/770
See application file for complete search history.

(56) References Cited

U.S. PATENT DOCUMENTS

| | | | | |
|---|---|---|---|---|
| 6,121,118 | A | 9/2000 | Jin et al. | |
| 6,151,005 | A * | 11/2000 | Takita et al. | 345/89 |
| 2004/0075630 | A1* | 4/2004 | Chiu | 345/92 |
| 2004/0263447 | A1 | 12/2004 | Hong et al. | |
| 2006/0092183 | A1* | 5/2006 | Malmberg | 345/690 |
| 2007/0001711 | A1* | 1/2007 | Kwak | 324/770 |
| 2007/0046587 | A1* | 3/2007 | Takahara | 345/76 |
| 2007/0080905 | A1* | 4/2007 | Takahara | 345/76 |
| 2008/0048946 | A1* | 2/2008 | Kwak | 345/76 |
| 2008/0054798 | A1* | 3/2008 | Jeong et al. | 313/504 |
| 2008/0068309 | A1* | 3/2008 | Kwak et al. | 345/82 |

FOREIGN PATENT DOCUMENTS

| | | |
|---|---|---|
| JP | 2006-098850 | 4/2006 |
| KR | 1020060079021 A | 7/2006 |
| KR | 10-2007-0073265 | 7/2007 |
| KR | 10-2007-0094369 | 9/2007 |

OTHER PUBLICATIONS

KIPO Office action dated Jan. 4, 2010 for the corresponding Korean Priority Application No. 10-2008-0042211.

* cited by examiner

*Primary Examiner* — Thuy Pardo
(74) *Attorney, Agent, or Firm* — Christie, Parker & Hale, LLP

(57) ABSTRACT

A mother substrate of an organic light emitting display device capable of effectively aging a plurality of organic light emitting display panels by sheet unit without scribing the panels is provided. In one embodiment, the invention relates to a substrate of an organic light emitting display device, including a plurality of organic light emitting display panels, a plurality of first wires configured to supply a pixel power source to the panels in a first direction, and a plurality of second wires configured to supply a reference power voltage to the panels in a second direction crossing the first direction, wherein voltage levels of the reference power voltage are set to different voltage levels relative to a position of panels on the substrate.

20 Claims, 5 Drawing Sheets

MOTHER SUBSTRATE OF ORGANIC LIGHT EMITTING DISPLAY DEVICES AND METHOD OF AGING THE SAME

CROSS-REFERENCE TO RELATED APPLICATION

This application claims priority to and the benefit of Korean Patent Application No. 10-2008-0042211, filed on May 7, 2008, in the Korean Intellectual Property Office, the entire content of which is incorporated herein by reference.

BACKGROUND OF THE INVENTION

1. Field of the Invention

The present invention relates to display devices, and more particularly to a mother substrate of an organic light emitting display device and a method of aging the same.

2. Description of Related Art

In general, a plurality of organic light emitting display panels are formed with one mother substrate, scribed and separated into respective panels. That is to say, in order to more effectively manufacture a large number of organic light emitting display devices, a so-called sheet-unit manufacturing method has been developed, which includes: forming panels of a plurality of organic light emitting display devices with one mother substrate and scribing it into separate panels.

The independently divided panels of the organic light emitting display devices are generally separately inspected, where each of the respective panels is inspected using an apparatus for inspecting a panel unit. However, the inspection process can be inefficient since the inspection needs to be separately carried out on each of the panels.

Accordingly, it is generally required that the panels of a plurality of the organic light emitting display devices be inspected sheet by sheet before being separated from the mother substrate.

The inspection of the panels that is to be carried out sheet by sheet as described above can include a lighting inspection, a leakage current inspection, etc. Also, an aging process may be carried out sheet by sheet to reduce the manufacturing time and cost.

In display devices, a newly formed organic light emitting diode is rapidly deteriorated at the beginning of driving, and then is gradually stabilized. The aging process is carried out to suitably compensate for the deterioration of the organic light emitting diode by first driving the organic light emitting diode and adjusting its drive voltage prior to the product release.

Therefore, driver power sources and/or drive signals are supplied to each of the panels for the aging process.

That is to say, a predetermined electric current flows in the organic light emitting diodes by supplying the driver power sources and/or drive signals to a plurality of the panels sheet by sheet, and by particularly supplying an aging signal to data lines of each of the pixels.

In order to reduce the aging time, the current value applied to each of the panels over a predetermined time period is increased. However, the increase in current value results in increased or aggravated voltage drop (IR drop) in sheet wires that supply driver power sources and/or drive signals to each of the panels.

In particular, the voltage drop in the sheet wires, e.g., to supply pixel power sources (ELVDD and ELVSS) supplied as a DC power source, is higher than other drive signals and/or reference power voltages (VGH and VGL) supplied for a predetermined time.

That is to say, the pixel power sources (ELVDD and ELVSS) having different voltage levels may be supplied to each of the panels since the voltage drop of the pixel power sources (ELVDD and ELVSS) varies according to the position of the panels formed on the mother substrate. This may cause driving problems or bright defects in some panels when aging is carried out sheet by sheet.

In particular, when the voltage drop of the first pixel power source (ELVDD) is severe, the voltage difference of ELVDD from the first reference power voltage (VGH) of a scan driver is different in every panel, which results in the driving problems and/or bright defects in the panels.

In order to address the above problems, the electric current applied to each of the panels should be low during the aging process, but the aging time may be increased.

SUMMARY OF THE INVENTION

Accordingly, the present invention is designed to address drawbacks of the prior art. In one embodiment, the present invention provides a mother substrate of an organic light emitting display device capable of effectively aging a plurality of organic light emitting display panels sheet by sheet by shortening the aging time while preventing driving problems and bright defects in the panels.

In another embodiment, the present invention provides a method for aging a mother substrate of an organic light emitting display device.

In yet another embodiment, the invention relates to a substrate of an organic light emitting display device, comprising, a plurality of organic light emitting display panels arranged in a matrix, a first wire group including a plurality of sheet wires located in peripheral regions of the panels and extending in a first direction for concurrently supplying at least one of a test power source or a test signal to the panels arranged in the first direction, and including first sheet wires for supplying a pixel power source to the panels, and a second wire group including a plurality of sheet wires in peripheral regions of the panels and extending in a second direction crossing the first direction for concurrently supplying at least one of a test power source or a test signal to the panels arranged in the second direction, and including second sheet wires for supplying a reference power voltage to the panels, wherein voltage levels of the reference power voltage supplied to the second sheet wires vary in accordance with a position of the second sheet wires on the substrate.

In this case, the voltage levels of the reference power voltage may be set to different voltage levels based on distances from a supply power source of the pixel power source to the particular panel units. Particularly, the voltage levels of the reference power voltage may be set to a decreased voltage level that corresponds with increased distance from the supply power source of the pixel power source to the panels.

Also, the first or second wire groups may further include third sheet wires to supply an aging signal to the panels. Here, the voltage levels of the reference power voltage may be applied at a different level in a second direction according to a magnitude of the aging signal. Particularly, the voltage difference between the voltage levels of the reference power voltage may be set to an increased voltage level in accordance with an increased aging signal.

Also, the voltage levels of the reference power voltage may be applied at different levels in the second direction in consideration of the voltage drop of the pixel power source supplied in the first direction.

In addition, the first sheet wires may transmit a first pixel power source (ELVDD), and the second sheet wires may transmit a first reference power voltage (VGH).

Furthermore, the first direction and the second direction may be set respectively to a vertical direction and a horizontal direction.

In another embodiment, the present invention provides a method for aging a substrate of an organic light emitting display device, the substrate comprising a plurality of organic light emitting display panels arranged in a matrix, the method comprising, supplying a pixel power source to the panels in a first direction, and supplying a reference power voltage to the panels in a second direction crossing the first direction, wherein voltage levels of the reference power voltage are set to different voltage levels in accordance with a position of the panels in the second direction.

In this case, the present invention provides a method for aging a mother substrate of an organic light emitting display device according to claim 10, wherein the voltage levels of the reference power voltage are applied at different voltage levels in consideration of a voltage drop of the pixel power source according to a position of the panels on the mother substrate.

Also, the present invention provides a method for aging a mother substrate of an organic light emitting display device according to claim 10, further comprising supplying an aging signal in the first or second direction, and wherein the voltage levels of the reference power voltage are applied at different voltage levels in the second direction according to a magnitude of the aging signal.

According to one embodiment of the present invention, a plurality of the organic light emitting display panels formed on the mother substrate may be aged sheet by sheet using the first and second wire groups.

Also, the mother substrate of an organic light emitting display device according to the present invention may be useful to reduce the aging time and also to prevent the driving problems and bright defects in the panels by applying different voltage levels for a reference power voltage (for example, a high level gate voltage (VGH)) supplied to the panels in consideration of the voltage drop of a pixel power source (for example, a first pixel power source (ELVDD)) supplied through sheet wires.

In another embodiment, the invention relates to a substrate of an organic light emitting display device, including a plurality of organic light emitting display panels, a plurality of first wires configured to supply a pixel power source to the panels in a first direction, and a plurality of second wires configured to supply a reference power voltage to the panels in a second direction crossing the first direction, wherein voltage levels of the reference power voltage are set to different voltage levels relative to a position of panels on the substrate.

Therefore, the mother substrate of an organic light emitting display device according to the present invention may be used to improve the efficiency of the aging process.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
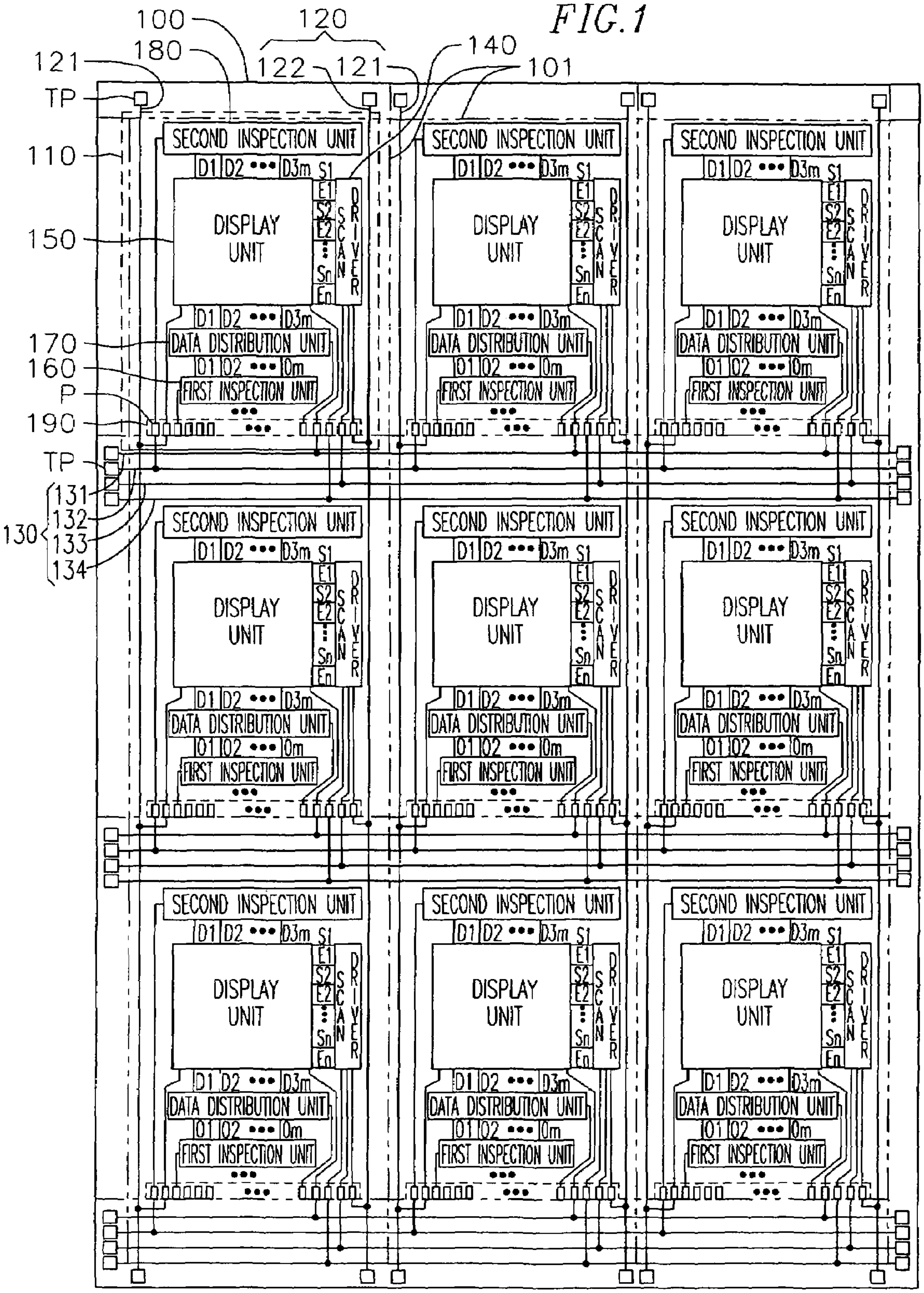
FIG. 1 is a plan view showing a mother substrate of an organic light emitting display device according to one exemplary embodiment of present invention.

Hereinafter, certain exemplary embodiments according to the present invention will be described with reference to the accompanying drawings. Here, when a first element is described as being coupled to a second element, the first element may be directly coupled to the second element or may be indirectly coupled to the second element via a third element. Further, some of the elements that are not essential to a complete understanding of the invention are omitted for clarity. Also, like reference numerals refer to like elements throughout.

Figure 2:
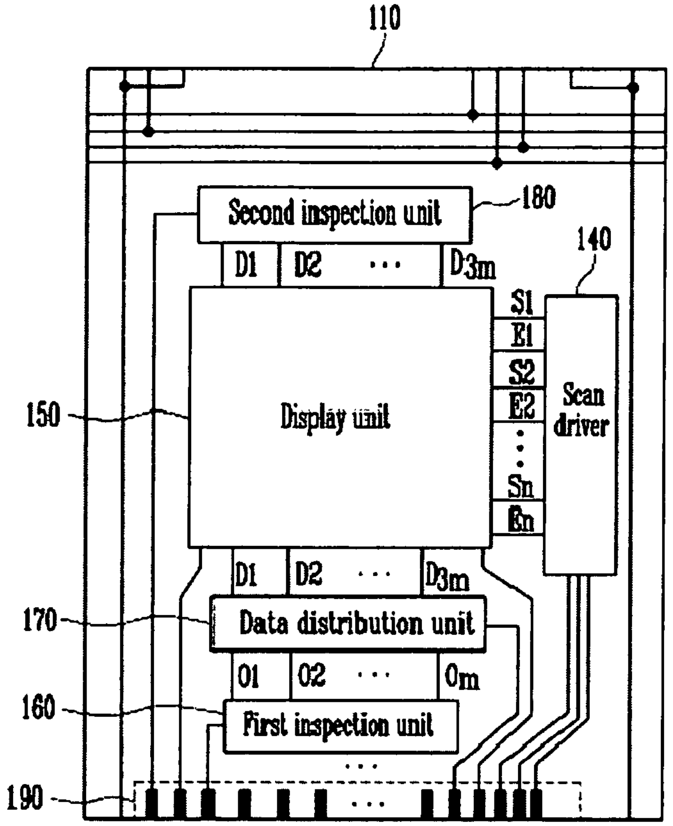
FIG. 2 is a plan view showing an organic light emitting display panel that is scribed from the mother substrate as shown in FIG. 1.

FIG. 1 is a plan view showing a mother substrate of an organic light emitting display device according to one exemplary embodiment of the present invention. FIG. 2 is a plan view showing an organic light emitting display panel that has been scribed from the mother substrate as shown in FIG. 1.

Referring to FIGS. 1 and 2, the mother substrate 100 of an organic light emitting display device according to one exemplary embodiment of present invention includes a plurality of organic light emitting display panels 110 arranged in a matrix structure, each panel having a first wire group 120 and a second wire group 130 disposed in an external or peripheral region of each panel 110 in a first direction and a second direction, respectively.

Each of the panels 110 includes a scan driver 140, a display unit 150, a first test unit 160, a data distribution unit 170, a second test unit 180, and a pad unit 190.

The scan driver 140 generates a scan signal and/or a light-emitting control signal in accordance with externally supplied first and second reference power voltages (a high level gate voltage (VGH) and a low level gate voltage (VGL)) and a scan control signal. Further, the scan driver 140 subsequently supplies the scan signal and/or the light-emitting control signal to scan lines (S1 to Sn) and/or light-emitting control lines (E1 to En).

In this case, a high level voltage of the scan signal and/or light-emitting control signal generated in the scan driver 140 is set to a first reference power voltage, that is, a high level gate voltage (VGH). A low level voltage of the scan signal and/or light-emitting control signal is set to a second reference power voltage, that is, a low level gate voltage (VGL).

The display unit 150 is composed of a plurality of pixels disposed at crossing points of data lines (D1 to D3*m*), scan lines (S1 to Sn) and light-emitting control lines (E1 to En). Each of the pixels includes an organic light emitting diode, and transistors for driving the organic light emitting diode.

The first test unit (or first inspection unit) 160 is electrically coupled to side ends of the data lines (D1 to D3*m*) via the data distribution unit 170. The first test unit 160 is configured to provide an array test (a first test) for testing the connection of transistors and/or wires disposed inside each of the panels 110. The first test unit 160 receives an array test signal (a first test signal) from an external array test device (not shown) and outputs the received array test signal into output lines (O1 to Om) during the array test.

The data distribution unit 170 is coupled between the first test unit 160 and the display unit 150. The data distribution unit 170 provides the array test signal, supplied from the output lines (O1 to Om) of the first test unit 160, to the data lines (D1 to D3*m*) in accordance with externally supplied clock signals (for example, red, green and blue clock signals). In one embodiment, for example, one pixel is composed of three subpixels, that is, red, green and blue subpixels, and the data distribution unit 170 provides an array test signal from the first test unit 160 to data lines (D) for the red, green and blue subpixels.

Meanwhile, when the test on the panels 110 is completed and each of the panels 110 has been scribed from the mother substrate 100, the data distribution unit 170 supplies a data signal to the data lines (D) of the subpixels, the data signal being supplied from the output lines of the data driver (not shown).

The second test unit (or second inspection unit) 180 is electrically coupled to other ends of the data lines (D1 to D3*m*). That is to say, the first test unit 160 and the second test unit 180 are coupled to opposite ends of the data lines (D1 to D3*m*). In the embodiment illustrated in FIG. 2, the first test unit 160 and the second test unit 180 are disposed on opposite sides of the display unit 150 to face each other. The second test unit 180 is provided for a sheet test (a second test) in which a plurality of organic light emitting display panels 110 formed on the mother substrate 100 may be tested at once using a sheet unit test. The sheet unit test may include a leakage current test, a lightening test, aging, etc.

The pad unit 190 includes a plurality of pads (P) to couple power sources and/or signals supplied from an external device with the panels 110.

The first wire group 120 is formed in external or peripheral regions of the organic light emitting display device panels 110. In one embodiment, for example, the external regions include the boundary regions between the panels 110 in a first direction (a vertical direction). The first wire group 120 includes a plurality of wires for receiving test power sources and/or test signals from an external device via a testing pad (TP). Therefore, the first wire group 120 distributes externally supplied test power sources and/or test signals at the same time to the panels 110 arranged in a first direction.

For example, the first wire group 120 may include first wires 121 to receive a first pixel power source (ELVDD) from an external device, and second wires 122 to receive a scan control signal (SCS) from the external device. The second wires 122 may be composed of a plurality of wires. In one embodiment, for example, each of the second wires 122 may be composed of three wires carrying a start pulse (SP), a scan clock signal (CLK), and an output enable signal (OE).

The first wire group 120 is often coupled to panels 110 arranged along a common vertical line to supply test power sources and/or test signals to the panel 110 in testing the panels 110 sheet by sheet, where the test power sources and/or test signals are supplied to the first wire group 120 and the panels 110 are coupled to the first wire group 120.

The second wire group 130 is formed in external or peripheral regions of the organic light emitting display panels 110. In one embodiment, for example, the external regions include the boundary regions between the panels 110 in a second direction (a horizontal direction) that crosses the first direction. The second wire group 130 includes a plurality of wires for receiving test power sources and/or test signals from an external device via a testing pad (TP). Therefore, the second wire group 130 concurrently distributes externally supplied test power sources and/or test signals to the panels 110 arranged in a second direction.

In one embodiment, for example, the second wire group 130 may include third wires 131 for receiving a second pixel power source (ELVSS) from an external device, and fourth wires 132 for receiving a sheet test control signal and a sheet test signal (a second test signal) from the external device. Here, the fourth wires 132 may be composed of a plurality of wires. In one embodiment, for example, each of the fourth wires 132 may be composed of four wires for carrying a sheet test control signal, a red sheet test signal, a green sheet test signal and a blue sheet test signal.

Also, the second wire group 130 further includes fifth wires 133 and/or sixth wires 134 for receiving a first reference power voltage (VGH) and a second reference power voltage (VGL) from an external device, respectively.

The second wire group 130 is often coupled to panels 110 arranged along a common horizontal line to supply test power sources and/or test signals to the panel 110 in testing the panels 110 sheet by sheet, where the test power sources and/or test signals are supplied to the second wire group 130 and the panels 110 are coupled to the second wire group 130.

Therefore, in several embodiments including the above-mentioned mother substrate 100 of an organic light emitting display device, the panels 110 may be tested for defects before scribing each of the panels 110.

The test on the panel 110 may be widely classified as an array test and/or a sheet unit test.

In one embodiment, the array test checks the connection transistors and/or wires in each of the panels 110. This array test is generally carried out prior to forming an organic light emitting diode, and, more specifically, between forming the transistors and forming an organic light emitting diode.

The array test is carried out panel by panel to detect those panels 110 whose wires are poorly connected in advance, and to repair the poor connected panels 110, if necessary. Identification of poorly connected panels enables subsequent processes, such as forming an organic light emitting diode.

More specifically, the array test may be carried out by supplying signals and/or power sources for the array test to the pad unit 190, exposed signal lines, power lines and/or electrodes panel by panel using an external array test device (not shown). Following the application of signals, the array test includes detecting an electric current flowing in wires and/or transistors, or detecting a voltage in the wires and/or transistors, etc.

In particular, in one embodiment of the array test, an array test signal is supplied to the first test unit 160 via the pad unit 190, and the array test signal is transmitted to the data lines (D1 to D3*m*) via the data distribution unit 170.

For this purpose, the first test unit 160 may include a plurality of transistors (not shown) for supplying the array test signal, which is supplied from one pad of the pad unit 190, to the data distribution unit 170 in accordance with the array test control signal supplied from another pad of the pad unit 190. While FIG. 1 shows that the first test unit 160 is coupled to one pad for the sake of convenience, the first test unit 160 may be coupled to at least two pads in other embodiments.

As described above, it is possible to confirm the connection of the wires and/or transistors in each of the panels (e.g., by sensing the presence of open circuit defects or short circuit defects) by supplying the array test signals to the panels 110.

In some embodiments, a sheet test is carried out for a lighting test, a leakage current test, and/or aging of the panels 110. This sheet test is generally carried out after the step of forming an organic light emitting diode is completed.

The sheet test is generally carried out sheet by sheet on a plurality of the panels 110 having independently completed the array test on the mother substrate 100. Such independent operation leads to the improved effectiveness of the sheet test.

However, in order to test the panels 110 sheet by sheet, sheet wires (that is, first and second wire groups 120 and 130 for coupling a plurality of the panels 110) are formed on the panels 110. Signals and/or power sources for sheet testing a plurality of the panels 110 are supplied to the panels 110 via the sheet wires.

The sheet test is generally carried out by supplying a sheet test signal to the second test unit 180 while the first test unit 160 and the data distribution unit 170 are disabled or off state. Thus, the sheet test signal and the array test signal are generally not supplied to the panels 110 at the same time.

For this purpose, the first and/or second wire groups 120 and 130 may further include at least one wire (not shown) electrically coupled to the first test unit 160 and the data distribution unit 170 to supply a bias signal to the first test unit 160 and the data distribution unit 170 during a period of operation for the sheet test on the panels 110. In other words, the bias signal is used to turn off or disable the first test unit 160 and the data distribution unit 170.

The second test unit 180 may include a plurality of transistors (not shown) turned on to supply red, green and/or blue sheet test signals from one sheet wire in the first and/or second wire groups 120 and 130 to the data lines (D1 to D3$m$) in accordance with the control signals supplied from another sheet wire of the first and/or second wire groups 120 and 130.

In some embodiments, the sheet test addresses the problem regarding difficulty in synchronizing the clock signals with the sheet test control signal and in effectively performing the sheet test on the panels 110 when a plurality of the panels 110 on same sheet are tested sheet by sheet using the first and second wire groups 120 and 130 at the same time.

As described above, the mother substrate 100 of an organic light emitting display device according to one exemplary embodiment of the present invention may be used to conduct the array test on each of the panels 110 formed on the mother substrate 100 and also to test a plurality of the panels 110 sheet by sheet.

Also, according to an embodiment of the present invention, the aging of a plurality of the organic light emitting display panels 110 formed on the mother substrate 100 may be carried out sheet by sheet using the first and second wire groups 120 and 130.

Hereinafter, a method for aging the panels 110 on the mother substrate 100 sheet by sheet will be described in more detail.

Initially, in one embodiment, first and second reference power voltages (VGH and VGL) and scan control signals are supplied to the scan driver 140 via the first and second wire groups 120 and 130. A sheet test control signal and an aging signal are supplied to the second test unit 180, and first and second pixel power sources (ELVDD and ELVSS) are supplied to the display unit 150. Also, a reset power source (Vinit) may further be supplied to the first or second wire groups 120 and 130, depending on the configuration of the pixels constituting the display unit 150.

When the first and second reference power voltages (VGH and VGL) and the scan control signals are supplied to the scan driver 140, the scan driver 140 generates a scan signal and/or a light-emitting control signal based on the first and second reference power voltages (VGH and VGL) and the scan control signals. The scan signal and/or the light-emitting control signal generated in the scan driver 140 is supplied to the display unit 150 through the scan lines (S1 to Sn) and/or the light-emitting control lines (E1 to En).

When the sheet test control signal and the aging signal are supplied to the second test unit 180, the second test unit 180 supplies an aging signal to the display unit 150 to correspond to the sheet test control signal.

In response to applied signals, the display unit 150 emits light based on the scan signal and/or the light-emitting control signal, the aging signal, and the first and second pixel power sources (ELVDD and ELVSS) for a suitable period (e.g., a predetermined period).

In a number of embodiments, the panels 110 are aged when an electric current flows in the panels 110 (e.g., a predetermined electric current), and when the driver power sources and drive signals for aging the panels 110 are supplied to each of the panels 110 via the first and second wire groups 120 and 130.

However, since the first and second pixel power sources (ELVDD and ELVSS) are DC power sources, a voltage drop is caused when power from the first and second pixel power sources (ELVDD and ELVSS) is distributed via the first and/or second wire groups 120 and 130. While only nine panels 110 arranged in the 3×3 type matrix are shown in FIG. 1 for the sake of convenience, more panels 110 are actually arranged on the mother substrate 100. Therefore, the voltage drop problem may become worse as the sheet wires that supply the first and second pixel power sources (ELVDD and ELVSS) increase in length. In order to address this problem, it might be possible to design a wide width for the sheet wires to supply the first and second pixel power sources (ELVDD and ELVSS) (e.g., to decrease wire resistance). However, since the first and/or second wire groups 120 and 130, including the sheet wires to supply the first and second pixel power sources (ELVDD and ELVSS), are formed in a dead space of the panels 110, it is difficult to expand the width of the sheet wires due to spatial limits.

The voltage drop of the first and second pixel power sources (ELVDD and ELVSS) is much greater than the voltage drop of the first and second reference power voltages (VGH and VGL) where power is consumed only when the scan driver 140 is switched on.

Also, when a plurality of the panels 110 are to be aged sheet by sheet, a higher magnitude of electric current is generally supplied to reduce the aging time and enhance the aging process efficiency. However, since a larger electric current flows in the sheet wires to provide the first and second pixel power sources (ELVDD and ELVSS), the voltage drop problem for these sheet wires becomes worse.

The voltage drop problem is more serious in the panels 110 that are relatively remote from the testing pad (TP) to which the first and second pixel power sources (ELVDD and ELVSS) are supplied. In one embodiment, for example, the remote panels include the panels 110 disposed in the central region of the mother substrate 100.

Therefore, the voltage difference between the first and second pixel power sources (ELVDD and ELVSS) and the first and second reference power voltages (VGH and VGL) is increased in those panels 110 in which the voltage drop of the first and second pixel power sources (ELVDD and ELVSS) is high, which leads to the driving problems, or the bright defects where certain panels 110 shine brighter than desired due to leakage electric current.

In particular, the increased voltage difference between the first pixel power source (ELVDD) and the first reference power voltage (VGH) may cause the driving problems and/or the bright defects. The aging process will be described later in more detail with reference to FIGS. 3 and 4.

Therefore, in order to prevent the unwanted voltage drop in the present invention, the sheet wires (first sheet wires) to supply the first pixel power source (ELVDD) and the sheet wires (second sheet wires) to supply the first reference power voltage (VGH) are arranged in different directions. A voltage level of the first reference power voltage (VGH) is applied at different voltage levels to compensate for the voltage drop of the first pixel power source (ELVDD).

For example, the sheet wires to supply the first pixel power source (ELVDD) may be coupled to the first wires 121 included in the first wire group 120, and the sheet wires to supply the first reference power voltage (VGH) may be coupled to the fifth wires 133 included in the second wire group 130.

In this case, since the first pixel power source (ELVDD) is supplied onto the mother substrate 100 in a vertical direction, the voltage drops are different at different positions along the vertical line. That is to say, when the first pixel power source (ELVDD) is supplied to upper and lower ends of the mother substrate 100 toward the center in vertical directions, the first pixel power source (ELVDD) having substantially no voltage drop is supplied to the panels 110 arranged at upper and lower portions of the mother substrate. On the contrary, the first pixel power source (ELVDD) having a relatively low voltage level is supplied to the panels 110 arranged at or near the center due to the voltage drop in the vertical direction.

At this time, since the first reference power voltage (VGH) can be supplied along a number of horizontal lines, the first reference power voltage (VGH) may be supplied at different voltage levels to the panels 110 arranged along each of horizontal lines.

Therefore, driving problems and/or bright defects of the panels 110 are prevented in the present invention by applying the first reference power voltage (VGH) at different voltage levels supplied line by line (or, supplied by a group of lines) in consideration of the voltage drop of the first pixel power source (ELVDD). The aging process will be described later in more detail with reference to FIG. 5.

Meanwhile, electrical contact points between the first and second wire groups 120 and 130 and the respective panels 110 are disposed outside of the scribing lines 101 of each of the panels 110. That is to say, the panels 110, which are disposed inside a region defined by the first to fourth scribing lines 101, are electrically coupled to the first and second wire groups 120 and 130 that are disposed outside of the region defined by the first to fourth scribing lines 101.

Therefore, each of the panels 110 is scribed, and separated as shown in FIG. 2. Then, the first and second wire groups 120 and 130 are electrically isolated from other components (for example, the scan driver 140, the display unit 150, the first test unit 160, the data distribution unit 170, and/or the second test unit 180) constituting each of the panels 110, and therefore the first and second wire groups 120 and 130 do not affect driving of the panels 110 after the scribing process.

That is to say, the first and second wire groups 120 and 130 are present in a peripheral portion of the scribed panel 110 while both ends of the first and second wire groups 120 and 130 are in a floated or unconnected state, and do not affect driving of the panels 110.

Meanwhile, although not shown in FIG. 2, the floated wires are coupled to the pads to receive a bias signal, thereby stabilizing the subsequent driving of the panels 110.

Also, FIG. 1 shows the mother substrate 100 having a plurality of organic light emitting display panels 110 formed therein, and also shows that drive circuits such as the scan driver 140 and the data distribution unit 170 are formed on the panels 110 in addition to the display unit 150. However, the present invention is not particularly limited thereto. For example, in the illustrated embodiment, only the display unit 150 is formed in each of the panels 110, and the drive circuits except for the display unit 150 may be mounted in a printed circuit board and the like, and also electrically coupled to the display unit 150 through the pad unit 190. In other embodiments, other arrangements of components are possible.

Figure 3:
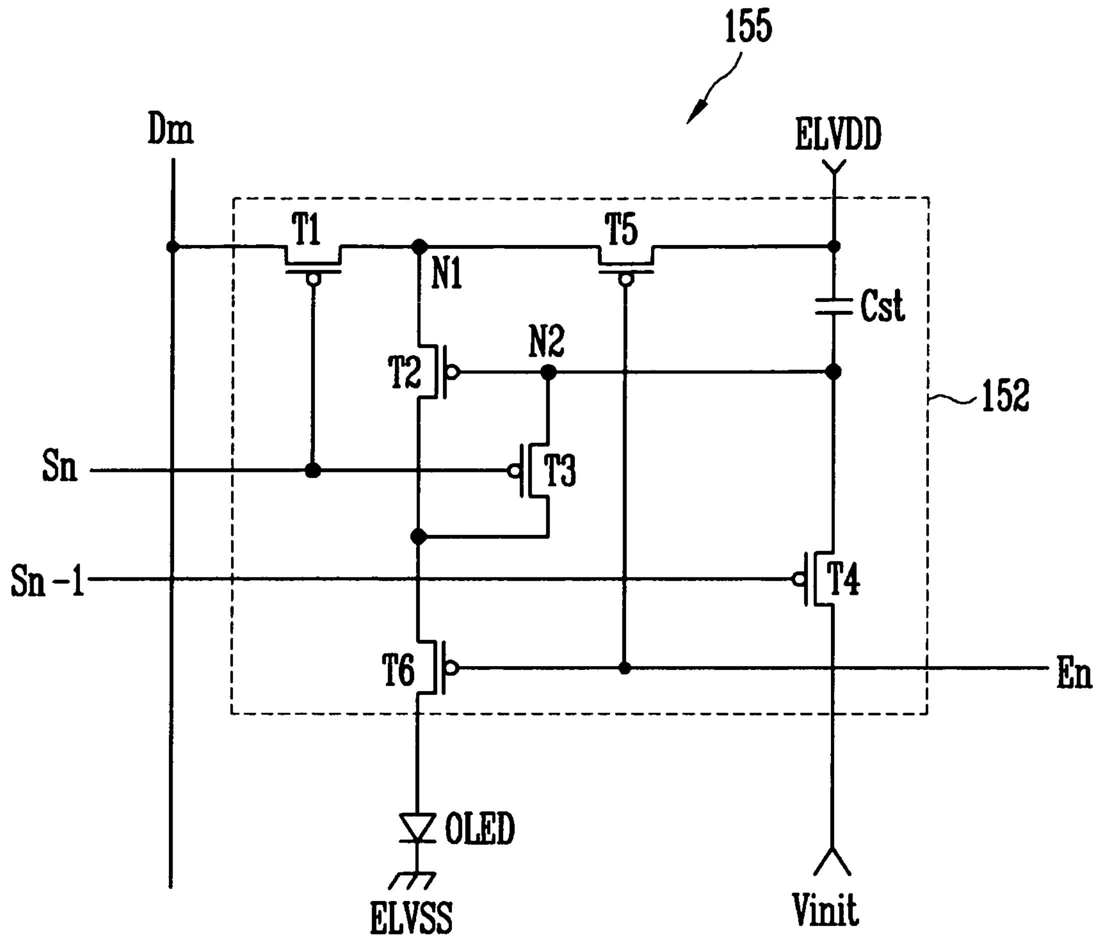
FIG. 3 is a circuit diagram showing one example of a pixel constituting a display unit as shown in FIG. 1.

FIG. 3 is a circuit diagram showing one example of pixels constituting a display unit as shown in FIG. 1. For the sake of convenience, FIG. 3 shows a pixel coupled to an $n^{th}$ scan line Sn) and an $m^{th}$ data line (Dm). However, the pixel as shown in FIG. 3 is merely illustrative as one exemplary embodiment, and the present invention is not particularly limited thereto.

Referring to FIG. 3, a pixel 155 includes an organic light emitting diode (OLED) and a pixel circuit 152 for controlling the organic light emitting diode (OLED).

An anode electrode of the organic light emitting diode (OLED) is coupled to the pixel circuit 152, and a cathode electrode is coupled to a second pixel power source (ELVSS). The organic light emitting diode (OLED) emits the light with a luminance that corresponds to an electric current supplied from the pixel circuit 152.

The pixel circuit 152 includes first to sixth transistors (T1 to T6) and a storage capacitor (Cst).

The first transistor (T1) is coupled between a data line (Dm) and a first node (N1), and a gate electrode of the first transistor (T1) is coupled to a current scan line (Sn). The first transistor (T1) is turned on when a scan signal (low level) is supplied to the current scan line (Sn), thereby supplying a data signal from the data line (Dm) to the first node (N1).

The second transistor (T2) is coupled between the first node (N1) and the organic light emitting diode (OLED) via a sixth transistor (T6). A gate electrode of the second transistor (T2) is coupled to the second node (N2). The second transistor (T2) controls the magnitude of electric current flowing from the first node (N1) to the organic light emitting diode (OLED), via the sixth transistor (T6), based on the voltage of the second node (N2).

The third transistor (T3) is coupled between the gate and the drain electrodes of the second transistor (T2). A gate electrode of the third transistor (T3) is coupled to the current scan line (Sn). The third transistor (T3) is turned on when a scan signal (low level) is supplied to the current scan line (Sn), thereby diode coupling the second transistor (T2).

The fourth transistor (T4) is coupled between the second node (N2) and a reset power source (Vinit), and a gate electrode of the fourth transistor (T4) is coupled to the previous scan line (Sn-1). The fourth transistor (T4) is turned on when a scan signal (low level) is supplied from the previous scan line (Sn-1), thereby resetting the second node (N2).

The fifth transistor (T5) is coupled between the first pixel power source (ELVDD) and the first node (N1), and a gate electrode of the fifth transistor (T5) is coupled to a light-emitting control line (En). The fifth transistor (T5) is turned off when a light-emitting control signal (high level) is supplied from the light-emitting control line (En). The fifth transistor (T5) is turned on when the light-emitting control signal is not supplied (that is, the light-emitting control signal is set to a low level), thereby electrically coupling the first pixel power source (ELVDD) to the first node (N1).

The sixth transistor (T6) is coupled between the second transistor (T2) and the organic light emitting diode (OLED), and a gate electrode of the sixth transistor (T6) is coupled to the light-emitting control line (En). The sixth transistor (T6) is turned off when a light-emitting control signal (high level) is supplied from the light-emitting control line (En), thereby preventing electric current from being supplied to the organic light emitting diode (OLED). The sixth transistor (T6) is turned on when the light-emitting control signal is not supplied (that is, the light-emitting control signal is to set to a low level), thereby supplying electric current, from the second transistor (T2) to the organic light emitting diode (OLED).

The storage capacitor (Cst) is coupled between the first pixel power source (ELVDD) and the second node (N2), and stores a voltage corresponding to a difference in the voltage supplied to the first pixel power source (ELVDD) and the voltage supplied to second node (N2).

Hereinafter, a method for driving the pixel 155 as shown in FIG. 3 will be described, with reference to the FIGS. 3 and 4.

Figure 4:
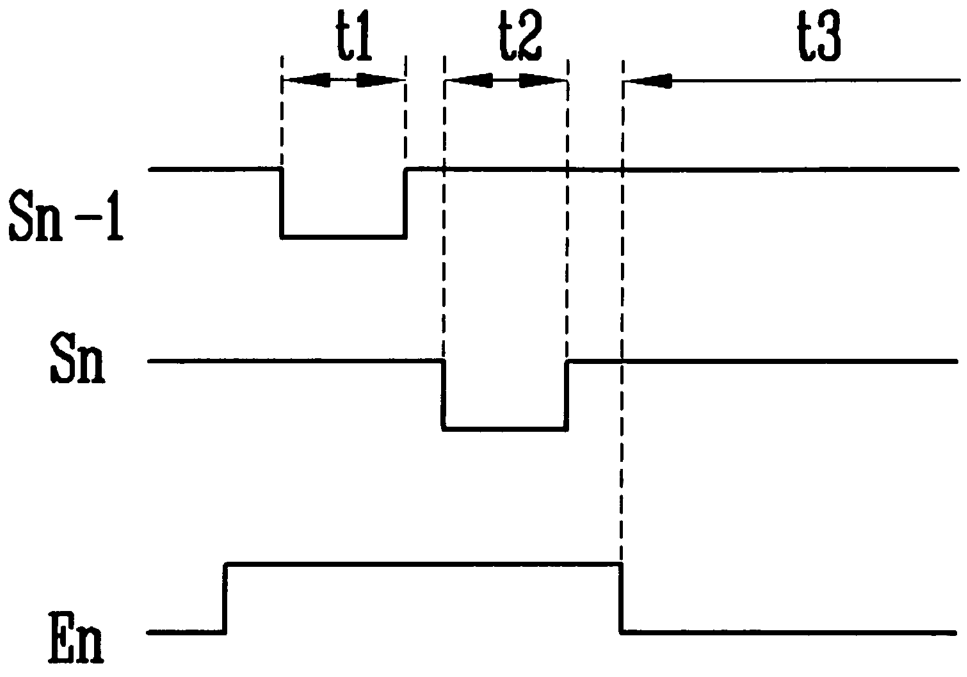
FIG. 4 is a waveform view showing a drive signal for driving the pixel as shown in FIG. 3.

Referring to FIG. 4, a scan signal with a low level is first supplied to the previous scan line (Sn-1) during a t1 period. Then, the fourth transistor (T4) is turned on. When the fourth transistor (T4) is turned on, a reset power source (Vinit) is supplied to the second node (N2) to reset the second node (N2). That is to say, the t1 period is a reset period.

Then, a scan signal with a low level is supplied to the current scan line (Sn) during a t2 period. Then, the first and third transistors (T1 and T3) are turned on. When the first transistor (T1) is turned on, a data signal supplied from the data line (Dm) is supplied to the first node (N1). When the third transistor (T3) is turned on, the second transistor (T2) is turned on while being diode coupled. Therefore, a data signal supplied to the first node (N1) is supplied to the second node (N2) via the second and third transistors (T2 and T3). Therefore, the data signal plus a voltage corresponding to the threshold voltage of the second transistor (T2) are supplied to the second node (N2) during the t2 period. Then, the storage capacitor (Cst) stores the voltage corresponding to the data signal and the threshold voltage of the second transistor (T2). That is to say, the t2 period is a data programming period plus a compensation period for the threshold voltage of the second transistor (T2).

Also, when the light-emitting control signal (En) is not supplied during the t3 period (that is, a voltage level of the light-emitting control signal is transitioned from a high level to a low level), the fifth and sixth transistors (T5 and T6) are turned on. When the fifth transistor (T5) is turned on, the first pixel power source (ELVDD) is transferred to the first node (N1). When the sixth transistor (T6) is turned on, electric current supplied from the second transistor (T2) is supplied to the organic light emitting diode (OLED) via the sixth transistor (T6) that corresponds to the voltage stored in the storage capacitor (Cst). Therefore, light with predetermined luminance is generated in the organic light emitting diode (OLED). That is to say, the t3 period is a light-emitting period of the pixel 155.

Meanwhile, an aging signal is supplied to the data line (Dm) of each of the pixels 155 as shown in FIG. 3 during a period that each of the panels 110 is aged on the mother substrate 100 of FIG. 1 sheet by sheet. That is to say, each of the pixels 155 is aged by driving the pixels 155 with a signal corresponding to the aging signal during the aging period.

However, each of the panels 110 receives the first pixel power source (ELVDD) having different voltage levels based on each panel's position along a vertical line due to the voltage drop of the first pixel power source (ELVDD) supplied along the vertical line during the period that each of the panels 110 is aged on the mother substrate 100 of FIG. 1.

In this case, if the same first reference power voltage (VGH) is applied to each of the panels 110, the voltage difference between the first pixel power source (ELVDD) and the first reference power voltage (VGH), both of which are supplied to the panels 110 line by line, is different. In this case, a voltage level of the first reference power voltage (VGH) is set to a reference voltage level that is an average value of the first pixel power source (ELVDD) supplied to the panels 110.

Therefore, in the panels 110 whose first pixel power source (ELVDD) has a relatively low voltage drop, for example in the panels 110 arranged at upper and lower portions of the mother substrate 100, the voltage level of the first pixel power source (ELVDD) may be greater than the voltage level of the first reference power voltage (VGH) by more than a predetermined reference voltage value, which leads to driving problems of the panels 110.

In such case, the fifth transistor (T5) may be turned on in the pixels 155 of each of the panels 110 since a light-emitting control signal (En), having a level of the first reference power voltage (VGH) supplied to the gate electrode of the fifth transistor (T5), may not be larger than the voltage level of the first pixel power source (ELVDD) by the threshold voltage of the fifth transistor (T5) during the t1 and t2 periods. That is to say, the fifth transistor (T5) that should be in an off state during the t1 and t2 periods is turned on, which leads to the driving problems in each pixel 155.

Also, in the panels 110 whose first pixel power source (ELVDD) has a relatively high voltage drop, for example in the panels 110 arranged in the central lines of the mother substrate 100, the voltage level of the first pixel power source (ELVDD) may become less than the voltage level of the first reference power voltage (VGH), by more than the reference voltage value, which leads to the bright defects of the panels 110.

More particularly, a leakage current may be generated through the fifth transistor (T5) in the pixels 155 of the panels 110 since the light-emitting control signal (En) having a voltage level of the first reference power voltage (VGH) supplied to the gate electrode of the fifth transistor (T5) is much greater than the voltage level of the first pixel power source (ELVDD) during the t1 and t2 periods. That is to say, the first reference power voltage (VGH) supplied to the gate electrode of the fifth transistor (T5) is transferred to the first node (N1) due to the abnormal leakage current during the t1 and t2 periods, thereby allowing each of the pixels 155 to emit light. Therefore, bright defects may be generated in certain panels 110 of the mother substrate 100.

Therefore, when the same first reference power voltage (VGH) is applied to each of the panels 110, the panels 110 should be aged within a voltage drop range in which the voltage drop of the first pixel power source (ELVDD) is not increased by more than a predetermined reference value (that is, an experimental reference value in which the driving problems and bright defects do not appear) (Note: Not larger than reference value).

As a result, an electric current that is applicable to the panels 110 per unit hour is limited in aging the panels 110, which leads to the increased aging time. This serves as a factor that reduces the aging efficiency.

Accordingly, the aging time is shortened in an embodiment of the present invention by increasing the magnitude of electric current that is applied to the panels 110 in aging the panels 110. In this case, the first reference power voltage (VGH) supplied to the panels 110 along a horizontal line is applied at different voltage levels to compensate for the voltage drop problem of the first pixel power source (ELVDD).

Figure 5:
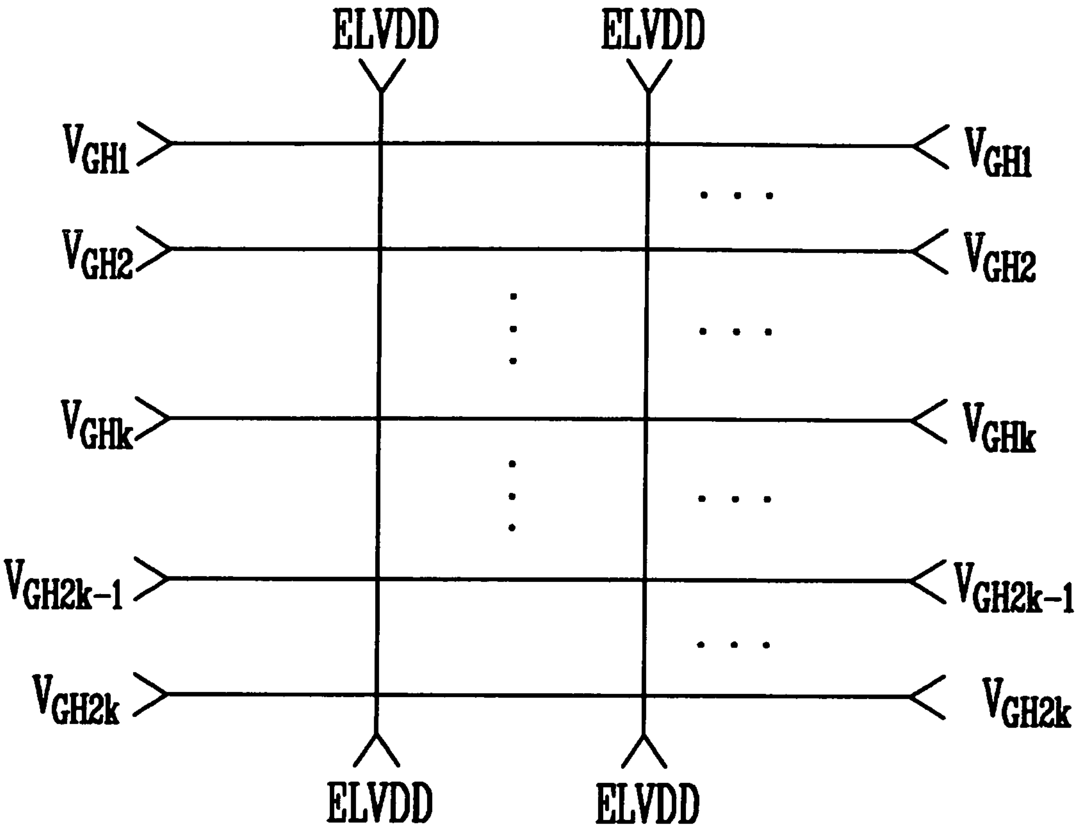
FIG. 5 is a layout view of sheet wires showing a method for applying different voltage levels for the first reference power voltage in the mother substrate of an organic light emitting display device as shown in FIG. 1.

FIG. 5 is a layout view of sheet wires showing a method of applying a first reference power voltage at different voltage levels along the mother substrate of an organic light emitting display device as shown in FIG. 1. For the sake of convenience, FIG. 5 shows a layout of some sheet wires to supply a first pixel power source (ELVDD) and a first reference power voltage (VGH).

Referring to FIG. 5, the first pixel power source (ELVDD) is supplied to each of the panels in a first direction, and the first reference power voltage (VGH) is supplied to each of the panels in a second direction, where the first and second are set to different directions along the mother substrate according to embodiments of the present invention.

For example, the first pixel power source (ELVDD) is commonly coupled to the panels 110 disposed in the same lines formed on the mother substrate 100, as shown in FIG. 1, and may be supplied through the first wire group 120 formed in a first direction (a vertical direction). The first reference power voltage (VGH) is commonly coupled to the panels 110 disposed in the same columns formed on the mother substrate 100, and may be supplied through the second wire group 130 formed in a second direction (a horizontal direction). However, the first direction and the second direction do not have to be defined in a vertical direction and a horizontal direction, respectively. For example, the first direction may be set to a horizontal direction, and the second direction may be set to a vertical direction.

In this case, voltage levels of the first reference power voltage (VGH) supplied in the second direction, that is, supplied along a horizontal line may be applied at different voltage levels, for example, VGH1, VGH2, . . . , VGHk, . . . , VGH2*k*-1, and VGH2*k*.

The different voltage levels of the first reference power voltage (VGH) may correspond to the voltage drop of the first pixel power source (ELVDD), along a vertical line and therefore may be varied according to the positions of the arranged panels 110. That is to say, the first reference power voltage (VGH) is applied at different voltage levels based on the distances from a supply power source of the pixel power source (ELVDD) to a particular horizontal row of panels 110. In such case, the voltage levels of the reference power voltage (VGH) are set to a decreased voltage level as the distance from the supply power source of the pixel power source (ELVDD) to the particular row of panels 110 is increased.

In one embodiment, for example, voltage levels of VGH1 and VGH2*k* may be set to the same voltage level, and voltage levels of VGH2 and VGH2*k*–1 may be set to a lower voltage level by as much as a predetermined voltage level than the voltage level of the VGH1 and VGH2*k*. Similarly, the voltage level of VGHk may be set to a lower voltage level than those of VGH2 and VGH2*k*–1. Also, the voltage levels of the first reference power voltage (VGH) supplied line by line may be applied at a different voltage levels in the same manner as described above. The voltage levels of the first reference power voltage (VGH) may be applied at different voltage levels by line by line, or applied at different voltage levels by a group of lines.

Also, the voltage level of the first reference power voltage (VGH) may be set to a predetermined voltage level that corresponds to a current value being applied to the panels 110 to shorten the aging time. For example, a voltage level of the first reference power voltage (VGH) may be set experimentally according to the voltage drop of the first pixel power source (ELVDD) in the position where each of the panels 110 is arranged to correspond to the current value that is applied in aging the panels 110. For example, the voltage difference between the voltage levels of the first reference power voltage (VGH) that is applied at different voltage levels line by line may be set to a higher voltage level when an increased aging signal is supplied from the sheet wires (third sheet wires) in the first or second wire groups 120 and 130.

That is to say, according to the present invention, the sheet wires to supply a first pixel power source (ELVDD) and the sheet wires to supply a first reference power voltage (VGH) are arranged in different directions. The voltage levels of the first reference power voltage (VGH) supplied to the panels 110 are applied at different voltage levels in consideration of the voltage drop of the first pixel power source (ELVDD) based on the position of the panels 110 arranged on the mother substrate 100, as shown in FIG. 1. Therefore, it is possible to prevent or reduce the driving problems and bright defects in the panels 110, and also to increase the aging electric current by compensating for the voltage drop of the first pixel power source (ELVDD). As a result, the aging time may be decreased, and the aging efficiency may be improved.

Meanwhile, the application of the first reference power voltage (VGH) at different voltage levels in accordance with the voltage drop of the first pixel power source (ELVDD) has been described in detail in the present invention by describing several embodiments of the pixels 155 as shown in FIG. 3, but the present invention is not particularly limited thereto.

For example, when each of the pixels is composed of NMOS-type transistors, the second reference power voltage (VGL) may be applied at different voltage levels based on the voltage drop of the second pixel power source (ELVSS).

That is to say, the present invention may be realized by applying the first and/or second reference power voltages (VGH and VGL) at different voltage levels to determine particular high-level and low-level voltages of drive signals such as a scan signal and/or a light-emitting control signal in consideration of the voltage drop in the sheet wires for concurrently supplying the first and/or second pixel power sources (ELVDD and ELVSS) to each of the panels 110 formed on the mother substrate 100 as shown in FIG. 1.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A substrate of an organic light emitting display device, comprising:

a plurality of organic light emitting display panels arranged in a matrix;

a first wire group including a plurality of sheet wires located in peripheral regions of the panels and extending in a first direction for concurrently supplying at least one of a test power source or a test signal to the panels arranged in the first direction, and including first sheet wires for supplying a pixel power source from a first side of the substrate to the panels; and a second wire group including a plurality of sheet wires in peripheral regions of the panels and extending in a second direction crossing the first direction for concurrently supplying at least one of a test power source or a test signal to the panels arranged in the second direction, and including second sheet wires for supplying a reference power voltage from a second side of the substrate to the panels, the second sheet wires including a first wire and a second wire, the first wire being closer to the first side than the second wire, wherein voltage levels of the reference power voltage supplied to the second sheet wires at the second side vary in accordance with a position of the second sheet wires on the substrate, the first wire being supplied with a first voltage level at the second side and the second wire being supplied with a second voltage level at the second side, the first voltage level being higher than the second voltage level.

2. The substrate according to claim 1, wherein the voltage levels of the reference power voltage supplied to the second sheet wires at the second side are set to different voltage levels in accordance with distances from a supply power source of the pixel power source to the panels.

3. The substrate according to claim 2, wherein the voltage levels of the reference power voltage supplied to the second sheet wires at the second side are decreased as the distance from the supply power source of the pixel power source to the panels increases.

4. The substrate according to claim 1, wherein the first or second wire groups further comprise third sheet wires to supply an aging signal to the panels.

5. The substrate according to claim 4, wherein the voltage levels of the reference power voltage supplied to the second sheet wires at the second side are set to different voltage levels according to a magnitude of the aging signal.

6. The substrate according to claim 5, wherein a voltage difference between the first voltage level and the second voltage level of the reference power voltage is increased in accordance with an increase in the magnitude of the aging signal.

7. The substrate according to claim 1, wherein the voltage levels of the reference power voltage supplied to the second sheet wires at the second side are set to different voltage levels in accordance with a voltage drop of the pixel power source supplied in the first direction.

8. The substrate according to claim 1, wherein the first sheet wires transmit the pixel power source, and the second sheet wires transmit the reference power voltage.

9. The substrate according to claim 1, wherein the first direction and the second direction are set to a vertical direction and a horizontal direction, respectively.

10. A method for aging a substrate of an organic light emitting display device, the substrate comprising a plurality of organic light emitting display panels arranged as a matrix in a first direction and in a second direction crossing the first direction, the method comprising:

supplying a pixel power source from a first side of the substrate to the display panels as arranged in the first direction; and supplying a reference power voltage from a second side of the substrate to the display panels as arranged in the second direction, the display panels including first panels arranged in the second direction and second panels arranged in the second direction, the first panels being closer to the first side than the second panels are to the first side, wherein voltage levels of the reference power voltage supplied at the second side are set to different voltage levels in accordance with a position in the first direction of the display panels as arranged in the second direction, the first panels being supplied with a first voltage level of the reference power voltage at the second side and the second panels being supplied with a second voltage level of the reference power voltage at the second side, the first voltage level being higher than the second voltage level.

11. The method according to claim 10, wherein the voltage levels of the reference power voltage supplied at the second side are set to different voltage levels in accordance with a voltage drop of the pixel power source supplied in the first direction.

12. The method according to claim 10, further comprising supplying an aging signal to the display panels in the first or second direction, wherein the voltage levels of the reference power voltage supplied at the second side are set to different voltage levels according to a magnitude of the aging signal.

13. A substrate of an organic light emitting display device, comprising:

a plurality of organic light emitting display panels arranged as a matrix in a first direction and in a second direction crossing the first direction;

a plurality of first wires extending in the first direction and configured to supply a pixel power source from a first side of the substrate to the display panels as arranged in the first direction; and a plurality of second wires extending in the second direction and configured to supply a reference power voltage from a second side of the substrate to the display panels as arranged in the second direction, the display panels including first panels arranged in the second direction and second panels arranged in the second direction, the first panels being closer to the first side than the second panels are to the first side, wherein voltage levels of the reference power voltage supplied to the second wires at the second side are set to different voltage levels in accordance with a position in the first direction of the display panels as arranged in the second direction, the first panels being supplied with a first voltage level of the reference power voltage at the second side and the second panels being supplied with a second voltage level of the reference power voltage at the second side, the first voltage level being higher than the second voltage level.

14. The substrate according to claim 13, wherein the voltage levels of the reference power voltage supplied to the second wires at the second side are set to different voltage levels in accordance with distances from a supply power source of the pixel power source to the display panels.

15. The substrate according to claim 14, wherein the voltage levels of the reference power voltage supplied to the second wires at the second side are decreased as the distance from the supply power source of the pixel power source to the display panels increases.

16. The substrate according to claim 13, further comprising a plurality of third wires configured to supply an aging signal to the display panels.

17. The substrate according to claim 16, wherein the voltage levels of the reference power voltage supplied to the second wires at the second side are set to different voltage levels based on a magnitude of the aging signal.

18. The substrate according to claim 17, wherein a voltage difference between the first voltage level and the second voltage level of the reference power voltage is increased in accordance with an increase in the magnitude of the aging signal.

19. The substrate according to claim 13, wherein the voltage levels of the reference power voltage supplied to the second wires at the second side is set to different voltage levels based on a voltage drop of the pixel power source supplied in the first direction.

20. The substrate according to claim 13, wherein the first direction and the second direction are a vertical direction and a horizontal direction, respectively.

* * * * *